May 22, 1923.
J. V. RICE, JR
1,456,009
AUTOMATIC LUBRICATING DEVICE FOR REMOTE MOVABLE AND OTHER PARTS
Original Filed Aug. 28, 1920
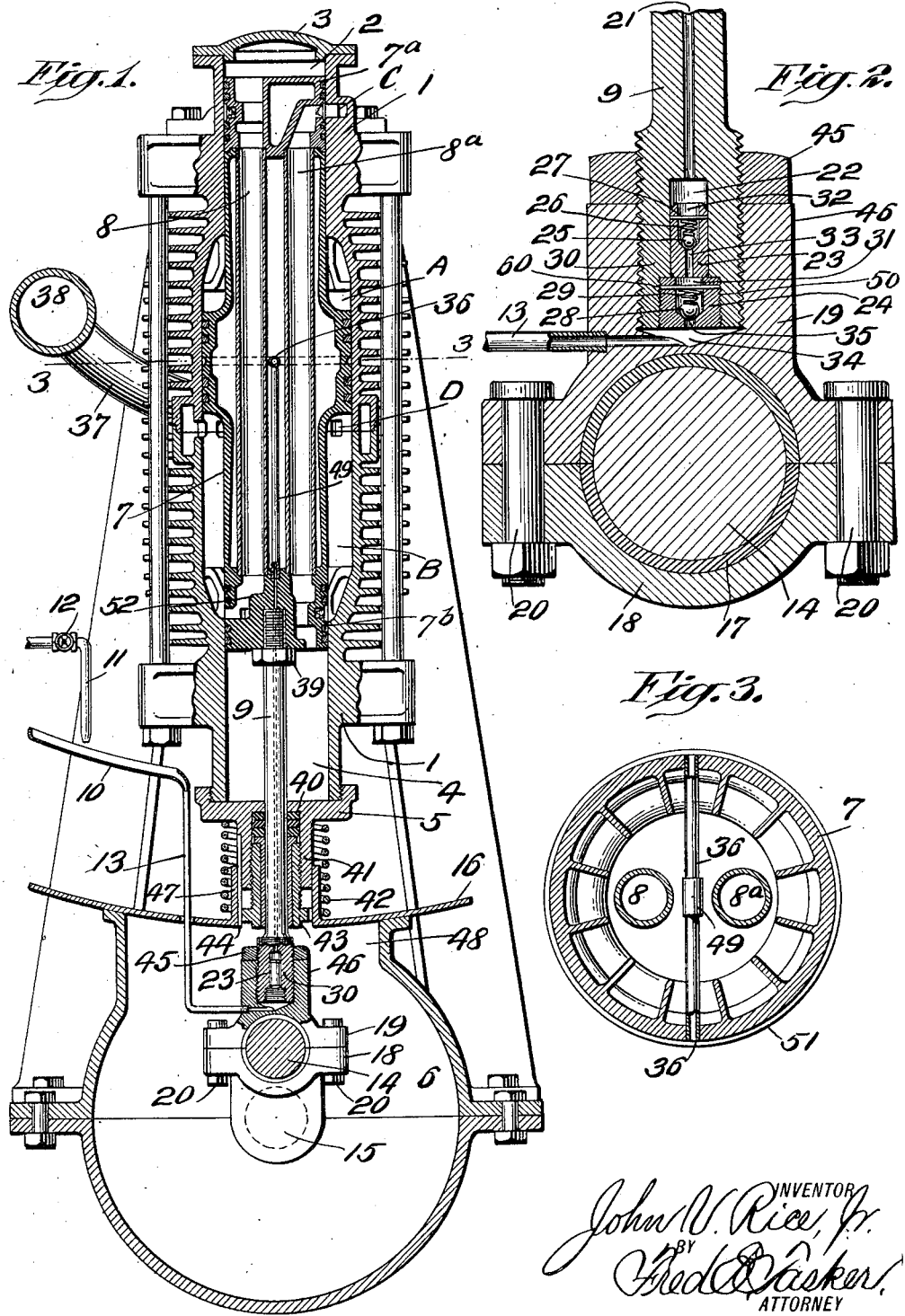

Patented May 22, 1923.

1,456,009

UNITED STATES PATENT OFFICE.

JOHN V. RICE, JR., OF BORDENTOWN, NEW JERSEY, ASSIGNOR TO RICE GAS ENGINE COMPANY, OF BORDENTOWN, NEW JERSEY, A CORPORATION OF NEW JERSEY.

AUTOMATIC LUBRICATING DEVICE FOR REMOTE MOVABLE AND OTHER PARTS.

Application filed August 28, 1920, Serial No. 406,723. Renewed March 13, 1923.

*To all whom it may concern:*

Be it known that I, JOHN V. RICE, Jr., a citizen of the United States, and resident of Bordentown, in the county of Burlington and State of New Jersey, have invented certain new and useful Improvements in Automatic Lubricating Devices for Remote Movable and Other Parts, of which the following is a specification, reference being had therein to the accompanying drawing.

This invention relates to a lubricating device for automatically feeding oil or other lubricating material in proper measure to a moving mechanical element, as, for example, an engine piston, or its rod, or some other active member. The chief object I have in view, among many that might be mentioned, is to carry the oil or lubricant into the interior working members of an engine or machine, and effect a thorough lubrication and smooth, noiseless, and frictionless operation of all the parts through a steady inflow of oil in moderate quantity, so as to subserve the interests of economy and at the same time insure efficiency and dependability of supply, delivering the latter at any desired remote, innermost point under such pressure regulation as may be most desirable. And, with this and other useful objects in view, the invention may be said to consist essentially in the construction, arrangement and combination of parts, substantially as will be hereinafter described and then more fully pointed out in the claims.

In the accompanying drawing which illustrates one practical form of my invention:

Figure 1 is a longitudinal section of an internal combustion engine, and shows my improved automatic lubricator practically applied thereto for the purpose of transmitting the lubricant through the piston rod to oil the piston.

Figure 2 is a partial sectional view of the crank pin of the same, and shows the detailed construction of my improved oiling device on an enlarged scale.

Figure 3 is a horizontal sectional plan view on the line 3, 3, of Figure 1.
Similar characters of reference designate like parts throughout the different figures of the drawing.

In the drawings, for explanatory purposes merely, I have adopted the design of oscillating internal combustion engine, which forms the subject-matter of my copending application for Letters Patent filed July 3, 1920, Serial Number 393,946. A detailed description thereof however is unnecessary here, and it will be sufficient to refer to the principal parts only, by stating that 1 denotes the cylinder, having heads 3 and 5, between which heads and the adjoining ends of the trunk piston 7 are the compression chambers 2 and 4. Within the cylinder 1 reciprocates the piston 7, having recessed heads $7^a$ and $7^b$, that are connected by passages or tubes 8 and $8^a$, so that two separate systems of tubes and chambers for handling the explosive mixture are provided. A and B denote the explosion chambers which surround the piston 7, and have a common central exhaust port D, through which the exhaust is taken away by pipes 37 and 38, pipe 38 being stationary, and pipe 37 arranged to oscillate with the cylinder, while an inlet C has the function of introducing the explosive mixture of air and gas into the aforesaid separate gas systems and allowing it to reach the compression and explosion chambers.

A piston rod 9 is connected with the piston by screwing it into the lower head $7^b$ of the piston 7, and a lock nut 39 on said rod 9 screws up tightly against head $7^b$. Piston rod 9 passes through the packing gland 40 located in recessed boss 41 on cylinder head 5, said packing being kept in place by means of the screw clamp 43 that screws into boss 41 and is locked in position by a suitable key or detent 44. The main engine shaft 15 has a crank and a crankpin 14, which pin 14 is carried in the bisectional journal box, having a Babbitt metal lining 17, and whose members 18 and 19 are held together by means of bolts 20, the section 19 having a vertical boss 46 with an internally-screw-threaded recess 34, into which the screw-threaded end 30 of the piston rod 9 is screwed, there being a lock nut 45 on rod end 30 that screws tightly against the end of said boss 46, and thus clamps the piston rod fixedly upon and to the crank bearing. Further, it will be noted that a sleeve 47 slips over and telescopes on the boss 41 of cylinder head 5, said sleeve being formed integral with the curved plate 16, which covers the opening 48 in the oil-filled crank casing 6, and slides back and forth over said opening in an oscillating type of engine like the one I am describing, so as to keep said casing 6 closed all the time and prevent the escape of oil, for said casing 6 surrounds shaft 15 and its crank and crank-pin 14 as well as the journal box for said pin consisting of parts 18 and 19. A spring 42 is interposed between head 5 and cover plate 16 so as to hold said cover closely over the opening 18, and exert a yielding pressure on the cover as it slides, thus preventing the escape of oil from casing 6.

The piston rod 9 has a longitudinal passage 21 through it, see Figure 2; and with the form of piston, as trunk piston 7, to which I am applying my invention for explanatory purposes in the present example, I provide a central pipe 49, in the piston, which pipe connects with the piston head 7ᵇ, and with a central oil passage 52 therein, with which oil passage the aforesaid passage 21 in the piston rod 9 also connects, see Figure 1. This tube 49 leads up through the centre of piston 7 and is connected with a horizontal tube 36 that empties at both ends into a circular oil groove 51 on the outside of the central portion of the piston 7 and between it and the adjoining interior wall of cylinder 1, so that oil may be supplied to lubricate the surface of the piston and cylinder during the reciprocatory movements of the engine. The other end of rod 9 distant from the cylinder 1 and outside the same is enlarged at 30 as already explained and screwed into the screw-threaded cavity 34 in the boss 46 on box section 19, see Figure 2, while the lock nut 45 screws against boss 46 and holds the piston-rod against any loosening which might tend to disconnect the parts.

Within the rod member 30 is a plunger-carrying and valve-containing recess or recesses, containing a pair of valves which function and operate in the way that I shall now explain. The recess is preferably a differential one, consisting of two parts, a larger screw-threaded outer part 50 that contains a screw-threaded hollow plug 24, and an inner smoothly bored part 22, of smaller diameter and containing a loose plunger or valve carrier 23, which is shorter than the length of bore 22 and is reciprocable therein between one end of bore 22 and the opposite end of the bore which is formed by the adjacent side of screw plug 24. The plug 24 has a cavity 31 therein, in which is a ball valve 28 that is normally held to its seat over the end of an orifice or inlet opening 35 leading from the lower end of recess 34 into cavity 31, by means of a spring 29 tensioned between valve 28 and a bar or grating 60 supported across cavity 31 so as to retain the spring 29 without obstructing the flow of the oil through the cavity 31. The reciprocating plunger or carrier 23 has a cavity 32 therein which contains a ball valve 25 that is normally held on its seat at the end of a central passage 33 in the member 23 by means of a spring 26 tensioned between valve 25 and a bar or grating 27 fixed across the cavity 32 in such a manner that it will hold the spring but not obstruct the flow of the lubricant in said cavity 32.

The passage or orifice 33 in member 23 leads from the cavity 31 to the cavity 32; and the passage or orifice 35 in member 24 leads from the cavity 34 to the cavity 31. The valve 28 is a primary valve which allows oil to pass into the cavity 31; and the valve 25 is a secondary valve which allows oil to pass from cavity 31 into cavity 32, whence it flows or is pumped readily into recess 22, and onward into any lubricating system that may be connected with said recess 22, as for example, the passage 21, tube 49, tube 36 and circular oil port 51, as I have already explained. The reciprocating plunger or carrier 23, in conjunction with the primary and secondary valves, acts as the plunger of an oil feed pump for drawing up the oil and forcing it to the most remote point of said system, the power for doing this being derived from the active running of the moving part that carries the oiling device.

Oil or any lubricant is delivered to the chamber 34 by means of a supply pipe 13 that leads from some suitable source of oil supply, such as a tank, can, or receptacle. In the present example of the invention, where the oil is supplied to an oscillating cylinder, I connect the pipe 13 with, or form it integral with, a shallow pan 10, which vibrates beneath a feed pipe 11, having a hand valve 12, as shown in Figure 1.

The operation of my improved device for lubricating a moving mechanical member will be fully understood from the foregoing description without requiring much in addition to be said. A constant supply of oil will reach the chamber 34 through the feed pipe 13, for the range of movement of pan 10 will always keep it in under the oil dropping from the inflow pipe 11. When the piston 7 is moving downwardly, and the piston rod 9 is moving in a like direction, the reciprocating plunger or carrier member 23 will obviously be carried downwardly with it, but as said plunger lies freely in the bore of chamber 22 in the piston rod section 30, it will evidently on such downward movement slide to the upper end of said bore 22, and this will cause a suction through the cavity 31 in plug 24, and the vacuum thus created will open valve 28 and draw oil through passage 35 from chamber 34, so that the space above valve 28 in recess 31 will be filled, the secondary valve 25 during this upwardly reciprocating movement of plunger 23 remaining closed. When the plunger 23 reaches the upper end of bore 22 its upward movement will stop and spring 29 will instantly close the primary valve 28, thus checking any back flow of the liquid which has passed by the valve 28. The movement of the piston 7 and rod 9 in the opposite direction will now take place, and the piston rod 9 will move upwardly, and the resulting effect on the plunger or carrier 23 will be to cause it to drop through bore 22 to the bottom of the latter, and as this action takes place the oil beneath carrier 23 and below valve 25 will push valve 25 open, the oil flowing upward as it will through passage 33 and the space above valve 25 will be filled with oil, that will find its way from recess 22 into passage 21 and thence through the tubular and other members of the oiling system to the parts to be lubricated, in so doing compressing spring 26 until the part 23 reaches the limit of its downward movement, when said spring 26 will close the secondary valve 25 and prevent the oil which has thus passed said valve from returning below it.

This reciprocation of the sliding-block 23, and the alternate opening and closing of the primary and secondary valves 28 and 25 will pump the oil from the chamber 34 and cause it to be transmitted to the parts to be lubricated, keeping the system abundantly supplied with oil all the time, and said pumping action being carried on through the utilization of the regular reciprocating movement of the piston rod, and its oscillating action in the operation of the engine, without requiring the provision of special actuating pumping means. Thus power and energy are saved and the device is at once both economical and practical. I am also able to direct the movement of the liquid through long interior passages to remote and inaccesible parts, and avoid the weakening of the engine frame and cylinder walls which would occur if holes were tapped through same to reach these parts directly from the outside.

The device herein described is of wide application, and I therefore wish to reserve the right of applying it in combination with any mechanical parts which are to be oiled and with which it is found useful; and I wish also to expressly reserve the privilege of varying, changing and re-combining the structural details within wide limits, in so far as this can be done without exceeding the scope of the appended claims.

Having thus described my invention, what I claim as new and desire to secure by Letters-Patent is:

1. In a lubricator, the combination of a reciprocating mechanical member, having a differential chamber therein and an oil passage leading away from said chamber for carrying off the oil pumped therein, a valve casing in the larger end of said chamber orificed to permit the passage of oil, an automatically yielding valve controlling the orificed casing, a loose plunger in the narrowest part of said differential chamber having a central passage through it, said plunger sliding in its chamber from one end to the other, and a yielding valve controlling the passage in said plunger, said first valve opening when the second valve is closed and said second valve opening when the first valve is closed.

2. The combination with a reciprocating piston rod, or similar part, and an oil chambered journal box with which it is connected, of a chamber in said piston rod, a valve between said chamber and the oil chamber of the journal box, a loose sliding pumping plunger in the rod chamber, and a valve in said plunger, both of said valves operating automatically and alternately during the reciprocation of the rod and journal box.

3. The combination with a piston and its rod, a main shaft having a crank pin, a bearing for said pin to which the rod is connected, said bearing having a recess that is constantly supplied with oil, a loosely-sliding pumping member in a recess in the piston rod, valve devices operated by the movement of the parts to cause the liquid to pass from the supply recess to the other side of the pumping member, and suitable passages for transmitting the liquid to interior and distant parts of any mechanism.

4. The combination with an externally-grooved piston and its rod, and a main crank shaft to which the rod is connected, of a loosely-sliding pumping member in a recess in the piston rod, valve devices operated by the movement of the parts to cause the liquid to pass from below the pumping member to a point above the same, and a tubular system for receiving the lubricant thus pumped and feed it to the groove in the exterior surface of the piston.

5. The combination with a piston and its rod, and a main crank shaft to which the rod is connected, of a loosely-sliding free pumping member in a chamber in said rod, said member having a passage through it, a spring-provided check valve seated in said passage, another spring-provided check valve arranged to admit liquid into the aforesaid pumping chamber, substantially as described.

6. The combination with a moving rod or the like mechanical part, having a chamber thereof of a differential character, a plug in the outer and larger part of said chamber, said plug having a cavity therein and an opening leading to the cavity, a primary spring-provided ball valve controlling said opening, a free pumping member in the part of the chamber of smaller diameter, said member having a cavity therein and a passage leading from the cavity in the plug, and a secondary spring-provided ball valve controlling the passage in the plunger, said valves operating automatically and alternately during the reciprocations of the parts to lift the lubricant and feed it forward for use while the mechanism is running.

In testimony whereof I hereunto affix my signature.

JOHN V. RICE, Jr.